United States Patent [19]
Pankow et al.

[11] 3,951,688
[45] Apr. 20, 1976

[54] METHOD AND APPARATUS FOR PASTING BATTERY PLATES

[75] Inventors: Herbert G. Pankow; Terrance M. Larkin, both of Littleton; Roland L. Young, Denver; Donald H. McClelland, Littleton, all of Colo.

[73] Assignee: The Gates Rubber Company, Denver, Colo.

[22] Filed: Apr. 23, 1974

[21] Appl. No.: 463,225

Related U.S. Application Data

[63] Continuation of Ser. No. 244,812, April 17, 1972, abandoned.

[52] U.S. Cl. .................................. 136/67; 136/27
[51] Int. Cl.² .......................................... H01M 35/26
[58] Field of Search ............... 136/67, 27, 120, 29; 118/117; 117/128, 62.5

[56] References Cited
UNITED STATES PATENTS

| | | | |
|---|---|---|---|
| 1,653,587 | 12/1927 | Rixdorff | 136/67 |
| 1,683,969 | 9/1928 | Garlock | 136/67 |
| 2,479,603 | 8/1949 | Chubb et al. | 136/67 |
| 2,555,301 | 6/1951 | Chubb | 136/67 |
| 3,121,029 | 2/1964 | Duddy | 136/120 R |
| 3,310,437 | 3/1967 | Dovel et al. | 136/120 R |
| 3,377,202 | 4/1968 | Belove | 136/29 |
| 3,486,942 | 12/1969 | Hatterschide | 136/67 |

*Primary Examiner*—John H. Mack
*Assistant Examiner*—C. F. LeFevour
*Attorney, Agent, or Firm*—Curtis H. Castleman, Jr.; Raymond Fink; H. W. Oberg, Jr.

[57] ABSTRACT

Method and apparatus are taught for applying an electrochemically active thixotropic paste onto a porous substrate. A discharge means such as a nozzle is used to deliver a predetermined amount of the paste onto the moving substrate which then enters the nip of a set of opposed driven rolls of desired spacing which compresses the paste into the interstices of the pores of the substrate to produce the desired plate.

10 Claims, 1 Drawing Figure

U.S. Patent   April 20, 1976   3,951,688
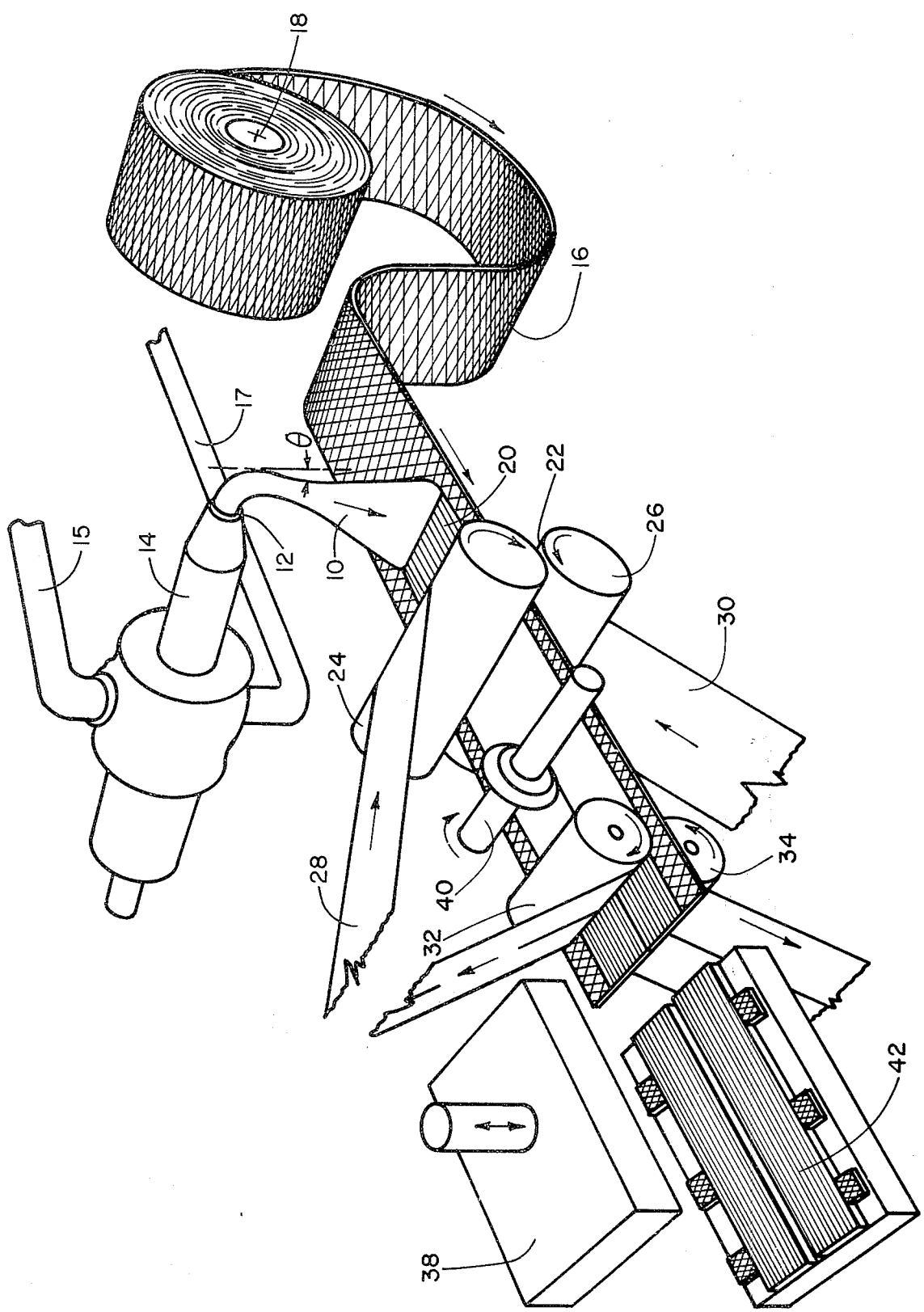

METHOD AND APPARATUS FOR PASTING BATTERY PLATES

This is a continuation of application Ser. No. 244,812 filed on Apr. 17, 1972, now abandoned.

CROSS REFERENCES TO RELATED APPLICATIONS

Copending U.S. Pat. application Ser. No. 244,485, now U.S. Pat. No. 3,814,628 filed concurrently herewith and assigned to the assignee of the present invention, relates to the general field of the present invention, and teaches a unique battery paste pumping and metering system utilizable with the present method and apparatus.

BACKGROUND OF THE INVENTION

This invention relates to methods and apparatus for applying electrochemically active paste to a metallic grid or other substrate for use in electrochemical cells, and particularly relates to such use in lead-acid systems.

The usual type of conventional lead-acid pasting machine utilizes a substantially rigid grid (e.g., cast lead) which moves horizontally while being pasted with active material via an open-air vertical feed gear pump. This pump directly bears and provides a downward force upon the moving grid. The paste is injected into the grid interstices under a positive head of pressure. The pump is not designed to meter out a given flow rate or amount of paste, but rather discharges an excess of paste which is screeded off by a doctor blade positioned downstream of the pump, which blade bears directly upon the moving grid. Excess paste is recycled to the open-fed pump. One drawback with such machines is that the resultant thickness of the battery plate is determined solely by the thickness of the grid substrate. Oftentimes such a grid will consist of an expanded mesh which, because of irregularities in its surface, will vary in thickness along its length, thus producing a plate having a non-uniform thickness of pasted active material. Such conventional processes are conducted in a non-continuous fashion.

Furthermore, the open-fed aspect of such conventional machines requires close control to prevent air degradation of the paste, such paste being commonly known to set-up in a very short time when exposed to air. Another drawback with such machines has been their tendency to cause separation of the constituents of the paste as it is applied under pressure to the moving grid much like a calendaring operation, i.e., the aqueous vehicle and lead-oxide constituents of the paste may form distinct phases.

This conventional machine is particularly ineffective when the type of grid substrate utilized is relatively soft or deformable rather than of the conventional rigid plate type. The downward force produced by the pump mechanism on the moving grid, and the downward force produced by the doctor blade bearing upon the moving grid both have the tendency to deform and tear apart a relatively soft grid and prevent its continued free passage. Such soft, relatively pure lead grids have found important recent utility in lead-acid cells of the sealed, rechargeable, maintenance-free type operating on an oxygen cycle.

The primary object of the present invention is to provide a method and apparatus for continuously pasting a highly viscous, thixotropic battery paste onto a porous substrate, in which accurately predetermined plate dimensions are obtained. It is a further object to overcome the drawbacks presents in the prior art.

SUMMARY OF THE INVENTION

Briefly, the present invention includes a method for applying an electrochemically active thixotropic paste onto a porous substrate, the steps including (1) moving the substrate beneath a nozzle or other discharge means which delivers and distributes a uniform amount of the paste onto the substrate without materially deforming the same, (2) moving the thus pasted substrate through the nip of a set of driven spaced rolls, and (3) compressing the paste into the interstices of the porous substrate, the compression being accomplished to allow the substrate to freely pass through the rolls and undergo only minimum or no deformation. Roll spacing is used to control the desired thickness, width and density of the finished plate.

In another aspect of the invention, the aforementioned method is carried out utilizing a battery plate pasting apparatus which includes the paste composition, porous substrate, a discharge means for metering the paste onto the substrate in a desired manner, and the set of driven rolls.

BRIEF DESCRIPTION OF THE DRAWING

The invention will be more particularly set forth in various of its embodiments by reference to the single accompanying drawing of a perspective view depicting schematically the pasting apparatus according to the present invention.

PREFERRED EMBODIMENTS OF THE INVENTION

While the invention will be particularly described with reference to manufacture of electrode plates for lead-acid electrochemical cells, it is to be understood that the invention applies to the preparation of other types of electrode plates utilizing physically similar types of pastes (e.g., thixotropic) and substrates (e.g., deformable).

Referring to the single figure of the drawings, there is shown an extruding device comprising discharge nozzle 10 having a substantially circular inlet 12 connected to the output of a positive displacement pump 14, which in turn forms a portion of a paste circulation loop consisting in part of conduits 15 and 17.

This paste circulation system, metering pump 14 and nozzle 10 are more particularly discribed in the aforementioned copending application Ser. No. 244,485, hereby incorporated by reference. Briefly, as disclosed in the copending application, the paste circulation loop is substantially closed to preclude air degradation of the paste and to allow the circulating paste to be agitated and thoroughly mixed prior to discharge through the nozzle 10. Because of the particular consistency of the paste, it is preferred to employ a positive displacement pump 14, such as of the archimedes screw type, which initates and diverts a predetermined volumetric flow rate of paste through the discharge means onto a passing battery grid substrate 16. To enhance the consistency of the paste applied to the substrate, it is preferred that the amount of paste diverted from the loop to the discharge nozzle 10 through pump 14 be only a small proportion of the amount of paste allowed to recirculate in the closed loop, e.g., from about 1/15th to about 1/50th.

The type of paste employed is highly viscous, thixotropic, resembling a slurry-like suspension of discrete crystalline finely divided particles, such as lead-oxide suspended in aqueous vehicle. Such paste may rheologically resemble "quick clays", red mortar, cement or the like. The finely divided particles of active material are generally macromolecular in size, rather than colloidal. The paste materials are essentially non-plastic and behave like non-Newtonian fluids insomuch as the viscosity of the paste varies with its rate of flow in the closed loop network. Because of this particular nature of the paste, the processing parameters, particularly residency time, are critical to avoid "setting up" of the paste somewhere along the system. Specific examples of paste compositions which have the above characteristics include negative and positive lead-acid battery pastes which comprise a major proportion of oxides of lead, e.g., litharge, suspended in a minor proportion of a vehicle, e.g., water. Oftentimes additional paste constituents, such as expanders, elemental lead and $Pb_3O_4$ may be present. It is preferred that the battery paste contain no entrained fluids which may have the effect of degrading the paste by oxidation or other mechanism.

The substrate 16 is prreferably of a soft, flexible and malleable material which is made porous for receiving the paste material. The substrate may be in the form of woven wire-screen, perforated sheet metal, or an expanded mesh grid commonly used in the art, for instance. It is preferred that the presence of impurities, such as antimony, in the substrate be minimized to increase the hydrogen and oxygen overvoltages and to preclude passivation of the plate during cycling of the cell. Conventional lead grid substrates usually contain in excess of 0.1 percent impurity, particularly calcium or antimony, to impart structural integrity to the grids. According to the present invention, relatively pure grids of preferably at least 99.9% and more preferably of at least 99.99% purity of lead are utilized. However, impurities (e.g., calcium) aggregating greater than 0.1% which do not have the effect of substantially reducing the hydrogen overvoltage of the resultant plate may be utilized, even though the plate may be rigid.

The grid substrate may be supplied from spool 18 and delivered beneath the nozzle 10. it is an important aspect of this invention that such nozzle 10 does not bear with an appreciable downward component of force upon the moving grid 16 in the event that the preferred, soft substrate is utilized. Rather, it is preferred that the nozzle be merely in close proximity to the moving grid, meaning either that the nozzle is spaced above the moving grid or that it is in light contact with the grid. The latter may be accomplished by allowing the nozzle 10 to freely pivot about its inlet position 12 so that it rests upon or lightly drags along the moving grid and forms an acute angle $\theta$ with the vertical plane which transversely intersects the grid material. In this manner deformation of the grid and impediments to the free flow of the grid material through the apparatus are prevented.

The nozzle 10 preferably delivers the correct amount of paste to the top of the grid and distributes it in a ribbonlike manner from a substantially rectangular slot onto the grid. Preferably the discharge nozzle has a flow cross section and internal surface configuration to permit the viscous paste to be discharged at a predetermined volumetric flow rate without substantial "channelling," e.g., partial plugging, of the paste. A tapered surface with increasing cross section toward the discharge slit has been found suitable. The outlet face of the nozzle is preferably essentially parallel to the direction of the moving grid to further function in a manner similar to a doctor blade, without pressing against the grid, as shown in the aforementioned copending application.

The thin ribbon of paste 20 deposited upon the grid 16 is of sufficient viscosity to prevent appreciable permeation downwardly through the grid interstices. As the thus pasted grid 20 is moved to the left, it encounters the nip 22 of juxtaposed pasting rolls 24 and 26. Preferably the pasted grid is fed in a direction generally perpendicular to the plane intersecting the axes of the rolls to prevent undue stretching or other deformation of the grid if soft and pliable. These rolls will evenly distribute the paste to the desired width on the lead grid, as well as control and maintain the desired thickness of the pasted plate by merely adjusting the spacing between the rolls. The rolls are driven, such as by a variable speed drive (not shown). Although it is preferred to drive the rolls essentially the same speed, it may be desirable in certain instances to vary the individual speeds of the rolls 24 and 26.

In the embodiment shown, the rolls may be made of any desirable material, e.g., steel, and are prevented from adhering to the paste on the grid by interposed layers of a thin flexible stick-resistant material 28 and 30. Such material may desirably be one or more layers of paper, such as of a cellulosic base. To prevent adherence of the contiguous paste, the paper layers are preferably rendered non-hygroscopic by treatment with a suitable fluid compatible with the paste, such as water. This material facilitates compression of the plate and may either be left on the plate or withdrawn about rolls 32 and 34, if desired.

In another embodiment, the layers of paper or other material 28 and 30 may be omitted as long as the rolls 24 and 26 are rendered sufficiently non-adherent with respect to the paste to prevent sticking. This may be accomplished by utilizing a suitable porous material for the surface of the rolls and internally pressurizing the rolls with water or other fluid. Steam, atomized water, air or other gas may be suitably used for this purpose. Rolls which have been successfully utilized according to the invention without the use of an interposed paper layer have been constructed of sintered glass, graphite and carbon, for instance.

Mandrel 18 may preferably be driven with a variable speed motor so that the speed of the grid fed to the rolls can be controlled to coordinate with the volumetric flow rate of paste delivered from nozzle 10. By properly coordinating the discharge flow rate of paste and speed of the grid, the correct amount of paste will be delivered to the grid and compressed by the pasting rolls 24 and 26 to produce a plate of a desired width and thickness without appreciable (if any) excess paste. The width and thickness of the plate, as well as the resultant density and porosity of the paste composition may be accurately regulated by varying the distance between the pasting rolls. Compression of the paste onto the grid by the rolls will cause the grid to undergo no deformation or a minimum of deformation in the case where a soft grid is utilized to fully insure adherence of the paste to the grid. However, such compression is regulated so that the plate is freely allowed to pass between the rolls and continue downstream for further operations. As an example of such process utilizing substantially pure lead grids, the lead grid 16 prior to entry into the nip of the rolls 24 and 26 characteristically may be of a thickness of 0.055 inches, and subsequently is compressed to a thickness of about 0.040 inches after exiting from the pasting rolls. Such compression permits the paste composition 20 to flow into the interstices of the grid 16 for intimate contact between the substrate and active material of the resultant electrode plate.

It will be apparent to those skilled in the art that subsequent operations, such as use of a plate slitter 40, and plate cutter 38 for fabrication of the final electrode structures 42, may be included. The resultant plate is suitable for use in parallel stacked plate configurations or spirally wound configurations, and have demonstrated good cohesion and structural integrity during cycling of the cell.

It should be understood that the invention is capable of the variety of modifications and variations which will become apparent to those skilled in the art upon reading of the specification. Such modifications are intended to be encompassed within the scope of the invention as defined by the appended claims. For instance, while the pasting machine has been described with reference to a moving grid 16 and a stationary discharge nozzle 10, clearly the reverse roles could be taken and still maintain the desired relative movement between the two elements. Furthermore, while the pasting apparatus specifically described utilizes a horizontal feed and vertically spaced rolls, a different angle of feed such as a vertical feed using horizontally spaced rolls would be adoptable.

Additionally, while the invention has been exemplified by lead paste compositions, other highly viscous and thixotropic pastes such as zinc-active pastes for use in zinc-air or nickel-zinc cells are meant to be included.

What is claimed is:

1. A method for pasting lead-acid battery plate porous substrates with an electrochemically active thixotropic paste composition which maintains a non-plastic condition during the pasting operation, comprising the steps of:

circulating the paste in a substantially closed loop network so as to agitate and thoroughly mix the paste;

diverting a predetermined volumetric flow rate of the paste from the loop network to a discharge nozzle;

discharging said paste in the form of a thin ribbon through the nozzle positioned in close proximity to the substrate at said predetermined volumetric flow rate without substantially deforming the substrate while simultaneously moving said substrate horizontally beneath the nozzle in a continuous manner to thereby deposit the paste onto the upper surface of the moving substrate to form a pasted substrate;

moving the thus pasted substrate through the nip of a set of driven rolls, said rolls being spaced apart a predetermined distance; and compressing the paste into the interstices of the porous substrate to produce a plate of desired thickness and density of paste.

2. The method of claim 1 wherein said paste comprises lead-oxide and aqueous vehicle.

3. The method of claim 2 wherein said substrate is composed of soft lead having a purity of at least 99.9 percent.

4. The method of claim 1 wherein the discharge step is accomplished with the aid of a discharge nozzle whose internal surface and discharge slit cross-section are of a configuration to permit egress of the predetermined volumetric flow rate of paste without substantial "channeling" of the paste.

5. The method of claim 1 wherein a positive displacement pump is connected to said discharge nozzle and said closed loop and diverts only a portion of the paste in said closed loop and delivers it to said discharge nozzle at said predetermined volumetric flow rate.

6. The method of claim 1 wherein compression of the paste into the interstices of the porous substrate is conducted so that the substrate undergoes substantial reduction in dimensional thickness.

7. The method of claim 1 wherein the pasted substrate is moved horizontally and flat-wise into the nip of the driven rolls, said rolls having their axes disposed substantially horizontally.

8. The method of claim 1 wherein said rolls are made of a porous material internally pressurized with a fluid to inhibit adhesion of the paste to the surface of the rolls.

9. The method of claim 1 wherein a thin, flexible material resistant to adhering to said paste and which is rendered non-hygroscopic is fed into the nip of the rolls on either side of the substrate to thereby segregate the pasted substrate from the rolls.

10. The method of claim 9 wherein said material is cellulosic-based paper wetted with an aqueous liquid compatible with the paste.

* * * * *